(12) United States Patent
Joe et al.

(10) Patent No.: US 7,860,653 B2
(45) Date of Patent: Dec. 28, 2010

(54) OBSTACLE AVOIDANCE CONTROL APPARATUS

(75) Inventors: Shinichiro Joe, Yokohama (JP);
Yoshitaka Deguchi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 768 days.

(21) Appl. No.: 11/858,338

(22) Filed: Sep. 20, 2007

(65) Prior Publication Data

US 2008/0086269 A1    Apr. 10, 2008

(30) Foreign Application Priority Data

Oct. 5, 2006   (JP) .............................. 2006-273584

(51) Int. Cl.
*G08G 1/16* (2006.01)
(52) U.S. Cl. .................................... 701/301
(58) Field of Classification Search ................ 701/301
See application file for complete search history.

(56) References Cited

U.S. PATENT DOCUMENTS

| | | | | |
|---|---|---|---|---|
| 4,862,373 | A * | 8/1989 | Meng ......................... | 701/209 |
| 5,502,638 | A * | 3/1996 | Takenaka .................... | 701/87 |
| 6,926,374 | B2 * | 8/2005 | Dudeck et al. ............... | 303/191 |
| 7,447,593 | B2 * | 11/2008 | Estkowski et al. ........... | 701/301 |
| 2005/0073411 | A1 * | 4/2005 | Butler ........................ | 340/552 |
| 2005/0187678 | A1 * | 8/2005 | Myeong et al. .............. | 701/27 |
| 2005/0216181 | A1 * | 9/2005 | Estkowski et al. ........... | 701/200 |

FOREIGN PATENT DOCUMENTS

JP    07-179140    7/1995

* cited by examiner

*Primary Examiner*—Thomas G Black
*Assistant Examiner*—Shelley Chen
(74) *Attorney, Agent, or Firm*—Global IP Counselors, LLP

(57) ABSTRACT

An obstacle avoidance control apparatus is provided with an obstacle detecting section, a first obstacle proximity distance prediction section, a second obstacle avoidance direction determining section, a target vehicle body slip angle setting section and a vehicle behavior controlling section. The obstacle detecting section detects preceding obstacles. The first obstacle proximity distance prediction section predicts a closest proximity distance between the host vehicle and a first (closest) obstacle. The second obstacle avoidance direction determining section determines a second obstacle avoidance direction to avoid the second obstacle. The target vehicle body slip angle setting section sets a target vehicle body slip angle, such that the host vehicle faces further inward of the turning direction as the proximity distance increases. The vehicle behavior controlling section controls the host vehicle so that an actual vehicle body slip angle coincides with the target vehicle body slip angle at the time of closest proximity.

9 Claims, 7 Drawing Sheets

OBSTACLE AVOIDANCE CONTROL APPARATUS

CROSS-REFERENCE TO RELATED APPLICATIONS

This application claims priority to Japanese Patent Application No. 2006-273584, filed on Oct. 5, 2006. The entire disclosure of Japanese Patent Application No. 2006-273584 is hereby incorporated herein by reference.

BACKGROUND OF THE INVENTION

1. Field of the Invention

The present invention relates to an obstacle avoidance control apparatus capable of avoiding obstacles by applying auxiliary steering.

2. Background Information

Various obstacle avoidance control apparatuses have been proposed for avoiding a collision with an obstacle in front of a host vehicle. One example of an obstacle avoidance control apparatus is disclosed in Japanese Laid-Open Patent Publication No. 7-179140. This publication discloses an apparatus that steers a host vehicle so that a vehicle body slip angle of the vehicle is zero when avoiding an obstacle in front of the host vehicle.

SUMMARY OF THE INVENTION

It has been discovered that in a course traveled by a vehicle, a line that connects a position where the vehicle is in closest proximity to a preceding obstacle and a position of the obstacle (the point of the outer shape of the obstacle that is nearest to the traveled course of the vehicle) is perpendicular to a tangent of the traveled course of the vehicle. This does not include cases in which the traveled direction of the vehicle coincides with the line that connects the turning center position of the vehicle with the position of the center of the obstacle.

Consequently, since the overall shape of the vehicle is usually a substantially rectangular shape in which the transverse width is less than the longitudinal length, when the vehicle is in closest proximity to an obstacle, the distance between the vehicle and the obstacle is greatest when the vehicle body slip angle is zero. Therefore, it can be said that it is effective to bring the vehicle body slip angle to zero in order to increase the distance between the obstacle and the vehicle body when the vehicle is in proximity to the obstacle.

However, in cases in which the vehicle approaches another obstacle after avoiding the first obstacle, attempting to constantly keep the vehicle body slip angle at zero when avoiding the obstacle in accordance with the prior mentioned technology sometimes causes the turning radius of the vehicle to increase in order to avoid the other obstacle, and the capacity for avoiding the obstacle is therefore sometimes reduced.

The present invention was conceived in view of the problems described above. One object of the present invention is to provide an obstacle avoidance control apparatus in which the capacity for avoiding obstacles can be increased.

The above mentioned object can basically be attained by providing an obstacle avoidance control apparatus that comprises an obstacle detecting section, a first obstacle proximity distance prediction section, a second obstacle avoidance direction determining section, a target vehicle body slip angle setting section and a vehicle behavior controlling section. The obstacle detecting section is arranged to detect first and second obstacles in front of a host vehicle, with the second obstacle being detected as being farther in front of the host vehicle than the first obstacle. The first obstacle proximity distance prediction section is configured to predict a first obstacle proximity distance between the host vehicle and the first obstacle at a time of closest proximity between the host vehicle and the first obstacle. The second obstacle avoidance direction determining section is configured to determine a second obstacle avoidance direction that is predicted to avoid the second obstacle. The target vehicle body slip angle setting section is configured to set a target vehicle body slip angle in a direction at the time of closest proximity with respect to a vehicle body center of the host vehicle, such that the host vehicle faces further inward of the second obstacle avoidance turning direction as the first obstacle proximity distance increases. The vehicle behavior controlling section is configured to control a vehicle behavior of the host vehicle so that an actual vehicle body slip angle with respect to the vehicle body center at the time of closest proximity coincides with the target vehicle body slip angle at the time of closest proximity.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
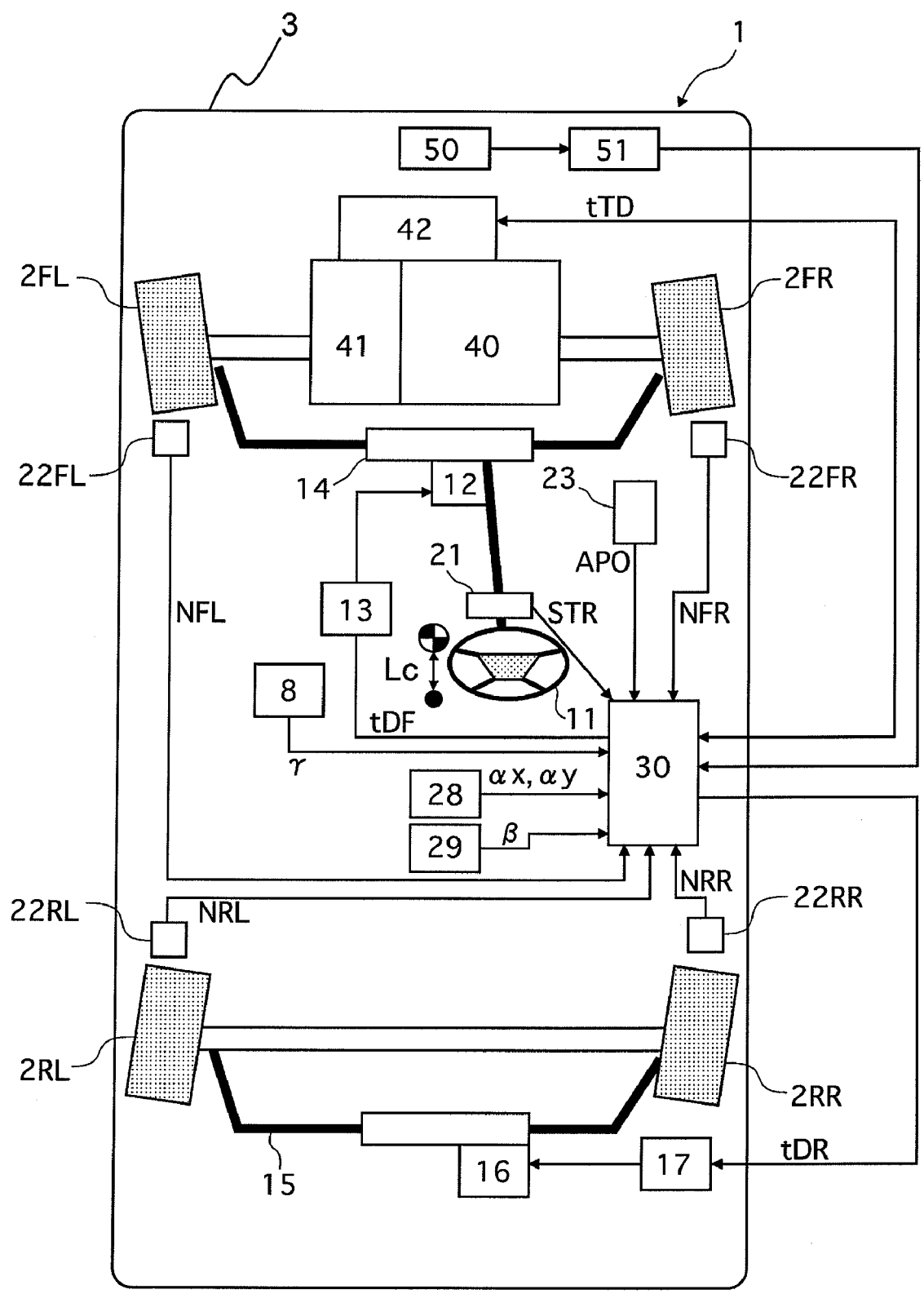
FIG. 1 is a simplified schematic diagram of a front wheel drive vehicle with four-wheel steering and an obstacle avoidance control apparatus in accordance with a first embodiment.

Referring initially to FIG. 1, a front wheel drive vehicle 1 is illustrated with four-wheel steering and an obstacle avoidance control apparatus in accordance with a first embodiment of the present invention. The vehicle 1 (hereinafter also called "the host vehicle") basically includes, among other things, a left front wheel 2FL, a right front wheel 2FR, a left rear wheel 2RL, a right rear wheel 2RR and a vehicle body 3. As explained below, the obstacle avoidance control apparatus of the first embodiment controls the turning angle of the wheels to avoid a first obstacle 4 and a second obstacle 5. As used herein, the second obstacle 5 refers to a preceding obstacle that is farther in front of the host vehicle 1 than the first obstacle 4. Also as used herein, the phrase "target vehicle body slip angle at the time of closest proximity" refers to a target vehicle body slip angle of the host vehicle 1 as determined from a center point of the host vehicle body 3 when the position of the center point of the host vehicle body 3 is at the time of closest proximity to the preceding obstacle in question.

As explained below, when the obstacle avoidance control apparatus of the first embodiment detects both the first and second obstacles 4 and 5, the obstacle avoidance control apparatus increases the target vehicle body slip angle at the time of closest proximity in direction so that the host vehicle 1 faces further inward of a second obstacle avoidance turning direction as the proximity distance to the first obstacle 4 increases. Consequently, in cases in which the host vehicle 1 is in closest proximity to the first obstacle 4 but is sufficiently distant from the first obstacle 4, the vehicle body 3 is oriented in advance in a direction to avoid the second obstacle 5. Thus, the tire force for varying the orientation of the vehicle body 3 can be reduced in order to avoid the second obstacle 5, and the tire force can be used for transverse movement in a proportional manner. The turning radius for avoiding the second obstacle 5 can therefore be reduced, and the capacity for avoiding the second obstacle 5 can be improved.

To control the steering angle of the front wheels 2FL and 2FR, the host vehicle 1 is further provided with, among other things, a yaw rate sensor 8, a steering wheel 11, an auxiliary steering motor 12, a control circuit 13, a steering gear 14, a rear steering rack 15, a rear steering motor 16, a control circuit 17, a steering angle sensor 21, a plurality of rotation sensors 22FL, 22FR, 22RL and 22RR, an accelerator pedal sensor 23, an acceleration sensor 28, a vehicle body slip angle sensor 29 and an integrated controller 30. To provide a driving force to the front wheels 2FL and 2FR, the host vehicle 1 is further provided with, among other things, an engine 40, a continuously variable transmission 41 and a power train controller 42. The engine 40 can be an internal combustion engine or the like, which functions as a drive force generator. The engine 40 has an engine output shaft linked to the front wheels 2FL and 2FR via the continuously variable transmission 41. The engine 40 and the continuously variable transmission 41 use the power train controller 42 to adjust the engine output and the gear change ratio so that the output torque coincides with a torque directive value tTD received from the integrated controller 30.

Preferably, the host vehicle 1 is further provided with, among other things, a camera 50 and an image-processing device 51. The image-processing device 51 uses the camera 50 to capture images in front of the host vehicle 1. The image-processing device 51 then recognizes a plurality of obstacles, and transmits obstacle information to the integrated controller 30. The obstacle shape information transmitted by the image-processing device 51 indicates, among other things, whether the roadway is straight or curved, whether the obstacle is a linear obstacle or a curvilinear obstacle, and whether the obstacle is a preceding vehicle, a pedestrian, or another such discrete obstacle. Obstacle position information is also transmitted to the integrated controller 30 by the image-processing device 51, according to the obstacle shape information, including distance and angle relative of the preceding obstacle to the vehicle if the obstacle is linear, the radius and center point if the obstacle is curved, and longitudinal and transverse coordinates in relation to the vehicle if the obstacle is discrete. The camera 50 and the image-processing device 51 correspond to an obstacle detecting section that is arranged to detect first and second obstacles in front of a host vehicle, with the second obstacle being detected as being farther in front of the host vehicle.

The driver primarily steers the front wheels 2FL and 2FR mechanically via the steering gear 14 by turning the steering wheel 11. The steering of the front wheels 2FL and 2FR is assisted by the auxiliary steering motor 12, which can displace the steering gear 14 through the entire range in the transverse direction of the host vehicle 1. Specifically, the steering angle of the front wheels 2FL and 2FR is the sum of a primary steering angle based on the steering wheel 11, and an auxiliary steering angle based on the auxiliary steering motor 12. The control circuit 13 adjusts the output of the auxiliary steering motor 12 to control the steering angle of the front wheels 2FL and 2FR so that the steering angle coincides with a target front wheel steering angle tDF transmitted by the integrated controller 30.

The rear wheels 2RL and 2RR are steered by the rear steering motor 16, which can displace the rear steering rack 15 through the entire range in the transverse direction of the vehicle. The control circuit 17 adjusts the output of the rear steering motor 16 to control the steering angle of the rear wheels 2RL and 2RR so that the steering angle coincides with a target rear wheel steering angle tDR transmitted by the integrated controller 30.

The integrated controller 30 receives various signals. In particular, the accelerator pedal sensor 23 detects an accelerator position of an accelerator pedal or a throttle valve, and then outputs an accelerator position signal APO to the integrated controller 30. The steering angle sensor 21 is attached to the rotating shaft of the steering wheel 11 to detect an angular position of the steering wheel 11. The steering angle sensor 21 then outputs a steering wheel rotational angle signal STR to the integrated controller 30. The yaw rate sensor 8 detects a yaw rate of the host vehicle 1, and then outputs a yaw rate signal y to the integrated controller 30. The acceleration sensor 28 is attached at the center of gravity of the host vehicle 1 to detect longitudinal and transverse accelerations of the host vehicle 1. The acceleration sensor 28 then outputs a longitudinal acceleration signal ax and a transverse acceleration signal ay to integrated controller 30. The vehicle body slip angle sensor 29 is attached at the center of gravity of the host vehicle 1 to detect a vehicle body slip angle. The vehicle body slip angle sensor 29 then outputs a vehicle body slip angle signal β to the integrated controller 30. The rotation sensors 22FL, 22FR, 22RL and 22RR are attached to the vehicle wheels to detect wheel speeds NFL, NFR, NRL and NRR, and then outputs the NFL, NFR, NRL and NRR to the integrated controller 30. The image-processing device 51 detects obstacle shape and position with respect to the host vehicle 1, and then outputs the obstacle shape information and the obstacle position information to the integrated controller 30.

Figure 2:
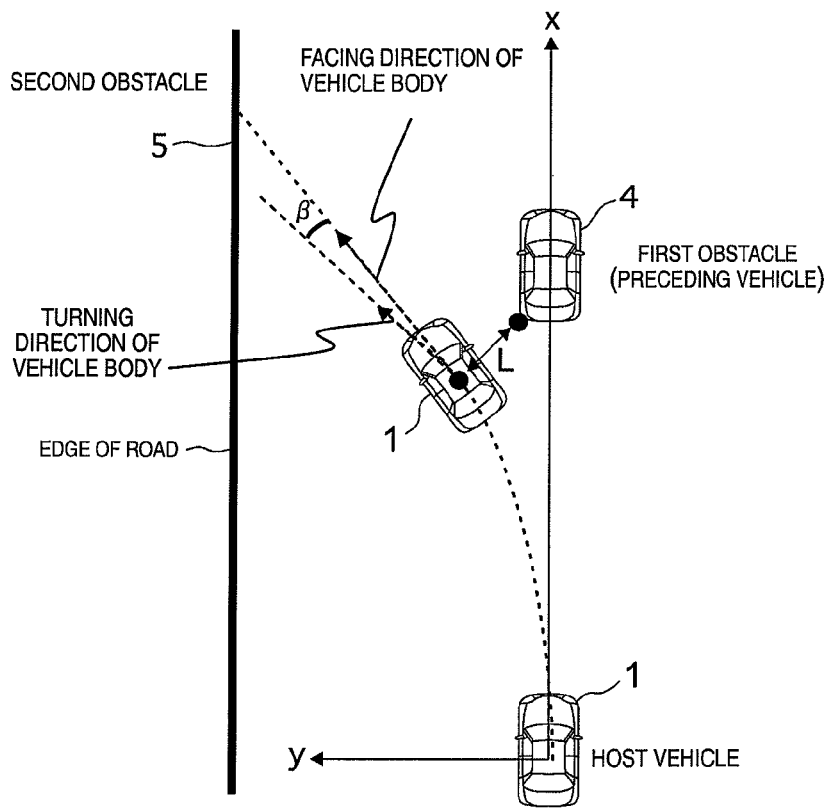
FIG. 2 is a simplified top plan view of a situation for illustrating an example of the conditions for performing obstacle avoidance control in accordance with the first embodiment.

The obstacle avoidance process will now be described. First, the type of obstacle defined in first embodiment will be described. FIG. 2 is a diagram for illustrating one situation involving the first and second obstacles 4 and 5 for describing an example of the conditions for performing obstacle avoidance control in accordance with the first embodiment. The first obstacle 4 in this situation is a preceding vehicle that is located in front of the host vehicle 1. In a case in which this first obstacle 4 must be avoided, the obstacle second obstacle 5 (a guard rail or the like at the edge of the road in the case of FIG. 2), which is located farther from the front of the host vehicle 1 than the first obstacle 4 must also be avoided.

Figure 3:
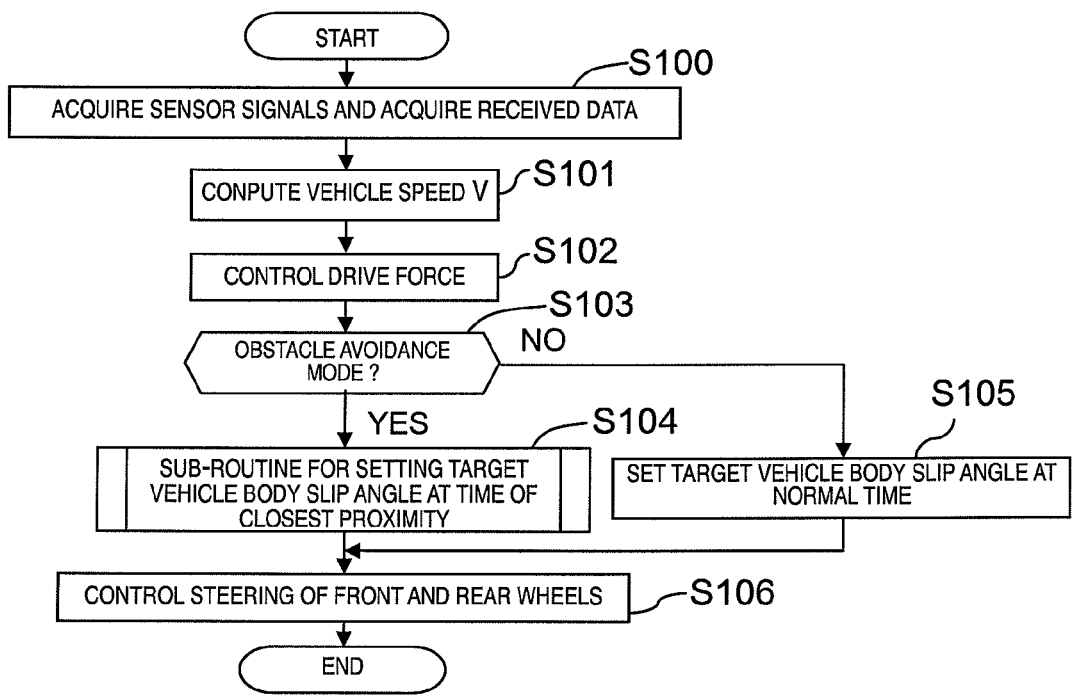
FIG. 3 is a flowchart showing an obstacle avoidance process executed by the integrated controller of the obstacle avoidance control apparatus in accordance with the first embodiment.

FIG. 3 showing an obstacle avoidance process executed by the integrated controller 30 of the obstacle avoidance control apparatus in accordance with the first embodiment. The integrated controller 30 performs the operations shown in the flowchart in FIG. 3 at specific time intervals, e.g., every 5 ms. The integrated controller 30 comprises a microcomputer with a CPU and a ROM, a RAM, and other components peripheral to the CPU. The integrated controller 30 serves to control the obstacle avoidance control apparatus.

In step S100, the signals received from the various sensors are stored in RAM as detected variables, and the process advances to step S101.

In step S101, the vehicle speed V is calculated, and the process advances to step S102.

In step S102, the driving force command value tTD is calculated on the basis of the vehicle speed V and the accelerator position APS to control the drive force of the host vehicle 1. The process then advances to step S103.

From step S103, the process advances to step S104 when a higher-rank controller sets an obstacle avoidance mode, and the process advances to step S105 when obstacle avoidance mode is not set.

In step S104, the below-described sub-routine for setting the target vehicle body slip angle at the time of closest proximity is performed, and the process advances to step S106.

In step S105, a normal time target vehicle body slip angle is set, and the process advances to step S106.

In step S106, when the host vehicle 1 is in closest proximity to the first obstacle 4 that is closest to the vehicle, the vehicle body slip angle at the vehicle body center is equal to the target vehicle body slip angle at the time of closest proximity, and a directive value for the front and rear wheel steering angles is calculated so as to achieve the transverse acceleration rate that corresponds to the steering operation of the driver, whereupon the process is ended. Step S106 corresponds to the vehicle behavior controlling section of the first embodiment.

Figure 4:
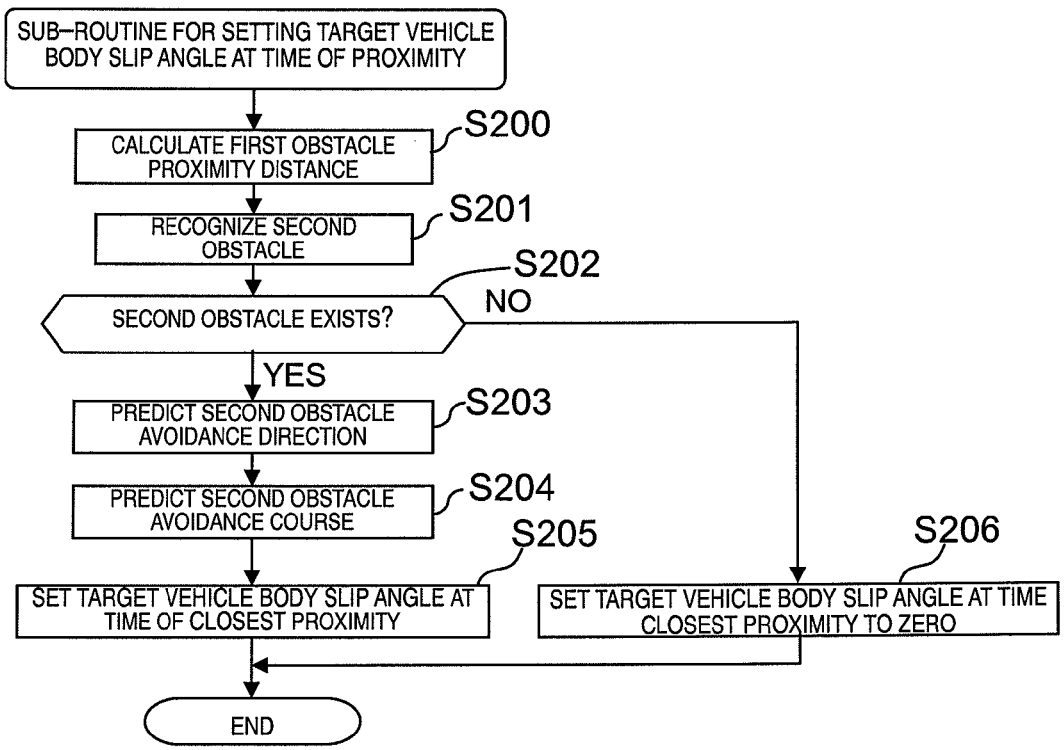
FIG. 4 is a flowchart showing a sub-routine process executed by the integrated controller of the obstacle avoidance control apparatus for the target vehicle body slip angle at the time of closest proximity in accordance with the first embodiment.

FIG. 4 is a flowchart showing the sub-routine process flow for the target vehicle body slip angle at the time of closest proximity, as performed in step S104 in the flowchart in FIG. 3.

In step S200, the distance between the host vehicle 1 and the first obstacle 4 when the center of the host vehicle 1 is closest to the first obstacle is set as the first obstacle proximity distance L. Thus, the location of the first obstacle 4 is set, and the process advances to step S201. This step S200 corresponds to the first obstacle proximity distance prediction section of the first embodiment.

In step S201, the second obstacle 5 is recognized, and the process advances to step S202.

In step S202, the presence or absence of the second obstacle 5 is determined. When the second obstacle 5 exists, the process advances to step S203. When the second obstacle does not exist, the process advances to step S206.

In step S203, the turning (obstacle avoidance) direction in which the host vehicle 1 avoids the second obstacle 5 is predicted, and the process advances to step S204. Step S203 corresponds to a second obstacle avoidance direction determining section that determines the obstacle avoidance direction to avoid the second obstacle 5 of the first embodiment.

In step S204, an obstacle avoidance course to be taken by the host vehicle 1 to avoid the second obstacle 5 is predicted, and the process advances to step S205.

In step S205, the target vehicle body slip angle assumed by the vehicle body at the center point of the host vehicle 1 when the host vehicle 1 is in closest proximity to the first obstacle 4 (referred to herein below as the target vehicle body slip angle at the time of closest proximity) is set, and the process returns to the flowchart in FIG. 3.

In step S206, the target vehicle body slip angle at the time of closest proximity is set to zero, and the process returns to the flowchart in FIG. 3. Steps S201, S202, S204, S205, and S206 correspond to a target vehicle body slip angle setting section that is configured to set the target vehicle body slip angle at the time of closest proximity according to the first embodiment.

The obstacle avoidance action will now be described. When obstacle avoidance mode has been set by the higher-rank controller, the process in the flowchart in FIG. 3 proceeds as follows: step S100→step S101→step S102→step S103→step S104→step S106→End. When obstacle avoidance mode has not been set by the higher-rank controller, the process in the flowchart in FIG. 3 proceeds as follows: step S100→step S101→step S102→step S103→step S105→step S106→End.

In step S100, signals received from the various sensors are stored in RAM as detected variables that change with conditions of the host vehicle 1. Specifically, the accelerator position signal is stored as the variable APS (in units of "%", wherein "100%" denotes the fully open position). The rotational angle signal for the steering wheel is stored as the variable STR (in units of "rad," wherein positive denotes counterclockwise). The vehicle body yaw rate signal is stored as the variable γ (wherein positive denotes the orientation during a left turn). The vehicle body transverse acceleration signal is stored as ay (wherein positive denotes the left). The vehicle body longitudinal acceleration signal is stored as ax (wherein positive denotes forward). The vehicle body slip angle signal is stored as β (wherein positive denotes counterclockwise turning). The wheel rotational speed signals are stored as NFL, NFR, NRL, NRR (all in units of "rad/s," wherein positive denotes the orientation of a forward-moving vehicle).

In step S101, the vehicle speed V (in units of "m/s", wherein positive denotes the orientation of a forward-moving vehicle) is computed based on the rotational speeds NRL and NRR of the driven wheels by using the following equation.

$$V = \frac{(NRL + NRR)}{2} \times R \quad (1)$$

wherein, R denotes the radius of the vehicle wheels.

Figure 5:
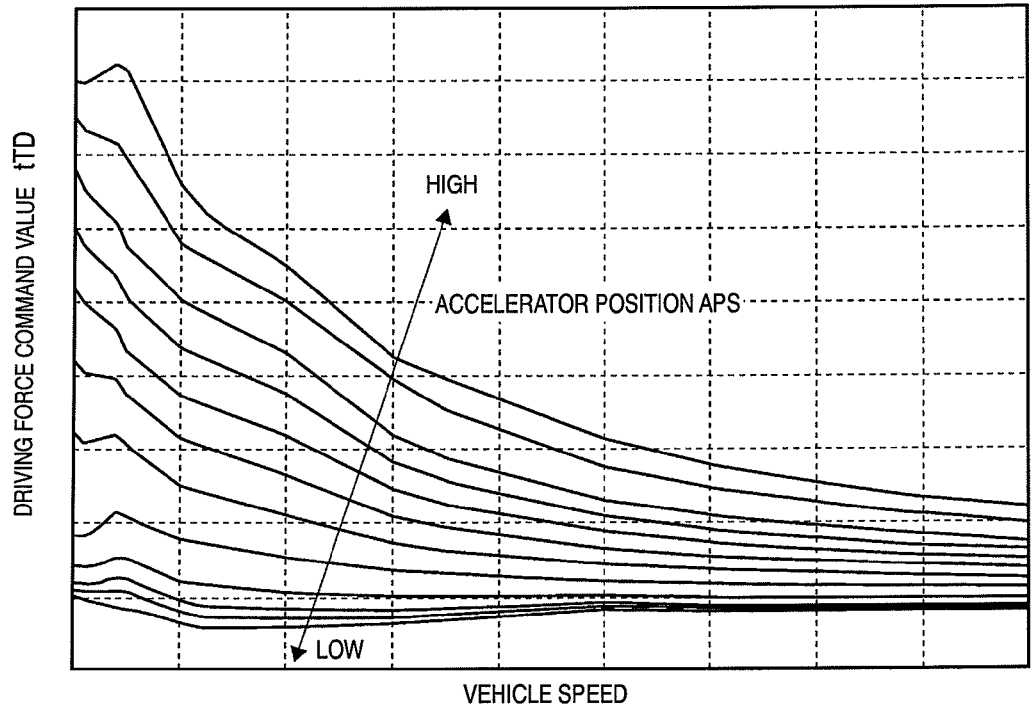
FIG. 5 is a map that is used by the obstacle avoidance control apparatus for calculating the driving force command value tTD on the basis of the vehicle speed V and the accelerator position APS in accordance with the first embodiment.

In step S102, a map is used to calculate the target driving force tTD on the basis of the vehicle speed V and the accelerator position APS. FIG. 5 is a map for calculating the driving force command value tTD on the basis of the vehicle speed V and the accelerator position APS. As shown in FIG. 5, the driving force command value tTD is set to decrease overall as the vehicle speed increases, and the driving force command value tTD is set to increase as the accelerator position APS increases.

In step S104, a target vehicle body slip angle at the time of closest proximity, which increases the capacity of the host vehicle 1 to avoid the first and second obstacles 4 and 5, is set according to the positions and shapes of the first and second obstacles 4 and 5, and also according to the predicted course of the host vehicle 1.

In step S105, since obstacle avoidance mode is not set, the zero vehicle body slip angle is set as the target vehicle body slip angle at the time of closest proximity. The zero angle is believed to yield the most comfort when the vehicle is turning.

In step S106, the target values of the front and rear wheel steering angles are calculated so that the vehicle body slip angle at the center point of the vehicle when the vehicle is in closest proximity to the first obstacle 4 is brought to the target vehicle body slip angle at the time of closest proximity, and so that the transverse acceleration rate corresponding to the steering of the driver is achieved. With the distance from the center of gravity of the host vehicle 1 to the center point of the vehicle body denoted by Lc (wherein positive denotes that the center position of the vehicle body is in front of the center of gravity of the vehicle), the relationship between the vehicle body slip angle $\beta$ at the center of gravity of the vehicle and the vehicle body slip angle $\beta c$ at the vehicle body center is expressed by the following equation.

$$\beta c = \beta + \frac{Lc}{V}\gamma \quad (2)$$

Consequently, from equation (2), the target vehicle body slip angle t$\beta$ at the center of gravity of the vehicle body when the vehicle is in closest proximity to the first obstacle 4 is expressed by the following equation, which is obtained using the target vehicle body slip angle t$\beta c$ (at the vehicle body center) at the time of closest proximity.

$$t\beta = t\beta c + \frac{Lc}{V}\gamma \quad (3)$$

When the front and rear wheels are steered by the same amount, the steady-state gain in the vehicle body slip angle from the same amount of steering is 1, while the steady-state gain in yaw rate and transverse acceleration rate from the same amount of steering is 0. In a steady state, the same steering angle can therefore vary the vehicle body slip angle without affecting the transverse acceleration rate.

The transverse acceleration rate is a result of the difference in steering angles between the front and rear wheels. Consequently, a front wheel steering angle command value tDF and a rear wheel steering angle command value tDR can be set as follows when the vehicle is in closest proximity to at least the first obstacle 4, so that the target vehicle body slip angle at the time of closest proximity is equal to t$\beta$, wherein dDF denotes the front wheel steering angle based on the steering of the steering wheel 11 by the driver.

$$tDF = t\beta + dDF \quad (4)$$

$$tDR = t\beta \quad (5)$$

The following is a description of the action of the subroutine for setting the target vehicle body slip angle at the time of closest proximity.

In cases in which the second obstacle 5 is present, the process in the flowchart in FIG. 4 proceeds as follows: step S200→step S201→step S202→step S203→step S204→step S205→Return. In cases in which the second obstacle 5 is not present, the process in the flowchart in FIG. 4 proceeds as follows: step S200→step S201→step S202→step S206→Return.

Figure 6:
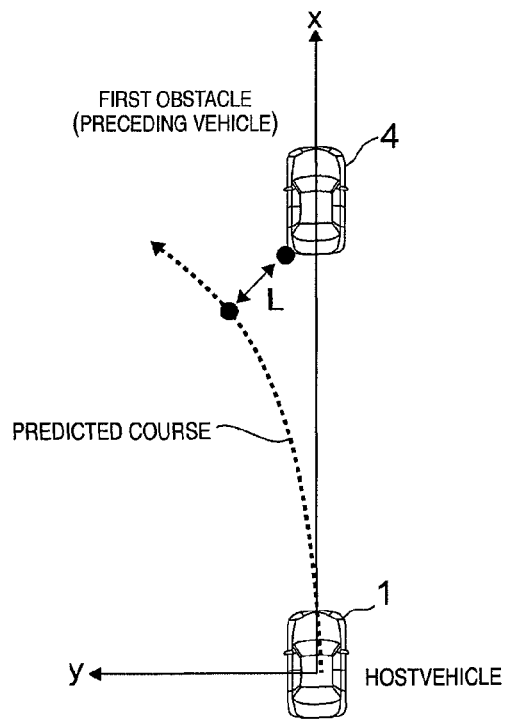
FIG. 6 is a simplified top plan view of a situation for illustrating the first obstacle proximity distance L in accordance with the first embodiment.

In step S200, the first obstacle proximity distance L is calculated. FIG. 6 is a diagram for illustrating the first obstacle proximity distance L. FIG. 6 shows an example in which the first obstacle 4 is a preceding vehicle, which is a discrete obstacle. For example, the predicted course of the host vehicle 1 based on the steering of the driver is estimated as shown in FIG. 6. The obstacle most quickly approached on this predicted course is set as the first obstacle 4. The distance of closest approach between the center of the vehicle body 3 and the first obstacle 4 is set as the first obstacle proximity distance L for the host vehicle 1 traveling along the predicted course.

The prediction of the course of the host vehicle 1 (a timetable plotted in XY coordinates) is computed based on the driving force command value tTD, the front wheel steering angle command value tDF, and the rear wheel steering angle command value tDR, by setting the vehicle speed V, the vehicle body slip angle $\beta$, and the yaw rate $\gamma$ at the current time as initial values and using, e.g., a vehicle movement model whose quantities of state are the vehicle speed V, the vehicle body slip angle $\beta$, and the yaw rate $\gamma$ shown in equations (6) through (11).

$$\frac{dX}{dt} = V\cos(\theta + \beta) \quad (6)$$

$$\frac{dY}{dt} = V\sin(\theta + \beta) \quad (7)$$

$$\frac{d\theta}{dt} = \gamma \quad (8)$$

$$\frac{dV}{dt} = \frac{1}{m \cdot R}tTD \quad (9)$$

$$\frac{d\beta}{dt} = -\frac{2(Kf + Kr)}{m \cdot V} - \left\{1 + \frac{2(Lf \cdot Kf - Lr \cdot Kr)}{m \cdot V^2}\right\}\gamma + \frac{2Kf}{m \cdot V}tDF + \frac{2Kr}{m \cdot V}tDR \quad (10)$$

-continued $$\frac{d\gamma}{dt} = \frac{2(Lf \cdot Kf - Lf \cdot Kr)}{I}\beta - \frac{2(Lf^2 \cdot Kf - Lr^2 \cdot Kr)}{I}\gamma + \frac{2 \cdot Lf \cdot Kf}{I}tDF - \frac{2 \cdot Lr \cdot Kr}{I}tDR \quad (11)$$

In these equations, θ is the yaw angle of the vehicle, m is the weight of the vehicle, R is the radius of the vehicle wheels, Kf is the cornering stiffness of the front wheels, Kr is the cornering stiffness of the rear wheels, Lf is the length from the center of gravity to the front wheel axle, Lr is the length from the center of gravity to the rear wheel axle, and I is the yaw moment of inertia. The vehicle movement model expressed in equations (6) through (9) is a linear approximation model in the vicinity of the equilibrium point.

Figure 7:
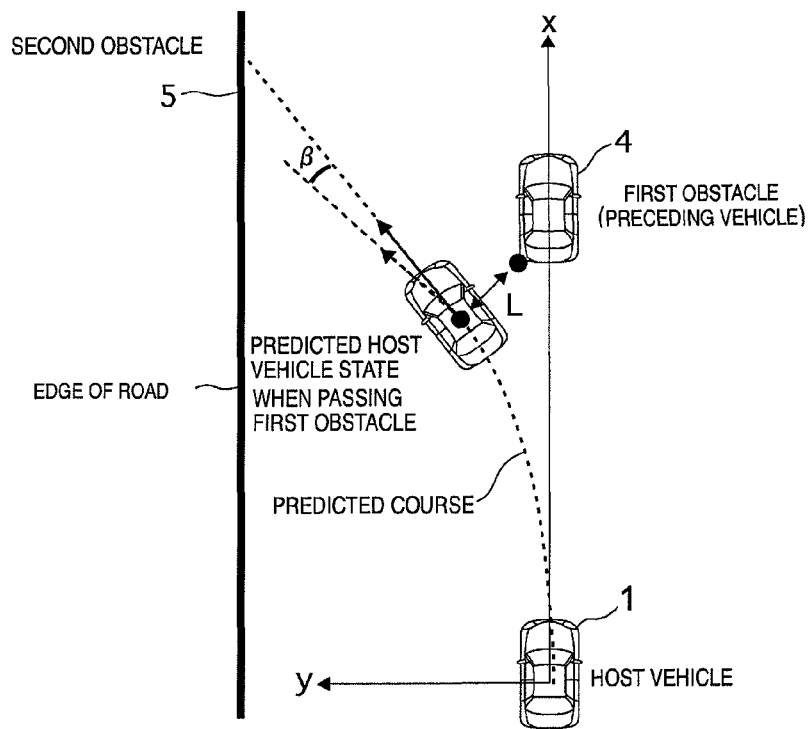
FIG. 7 is a simplified top plan view of a situation for illustrating the recognition of the second obstacle in accordance with the first embodiment.

In step S201, the second obstacle 5 is recognized. FIG. 7 is a diagram for describing the recognition of the second obstacle 5. For example, the second obstacle 5 is the obstacle in front of the host vehicle 1 that is most likely to come into proximity of the vehicle when the host vehicle 1 passes the first obstacle 4, as shown in FIG. 7. In the case of FIG. 7, the first obstacle 4 is a preceding vehicle, which is a discrete obstacle, and the second obstacle 5 is the edge of the road, which is a linear obstacle. Other types of obstacles can be set in addition to the types of obstacles illustrated in FIG. 7, which shows a discrete obstacle and a linear obstacle.

Figure 8:
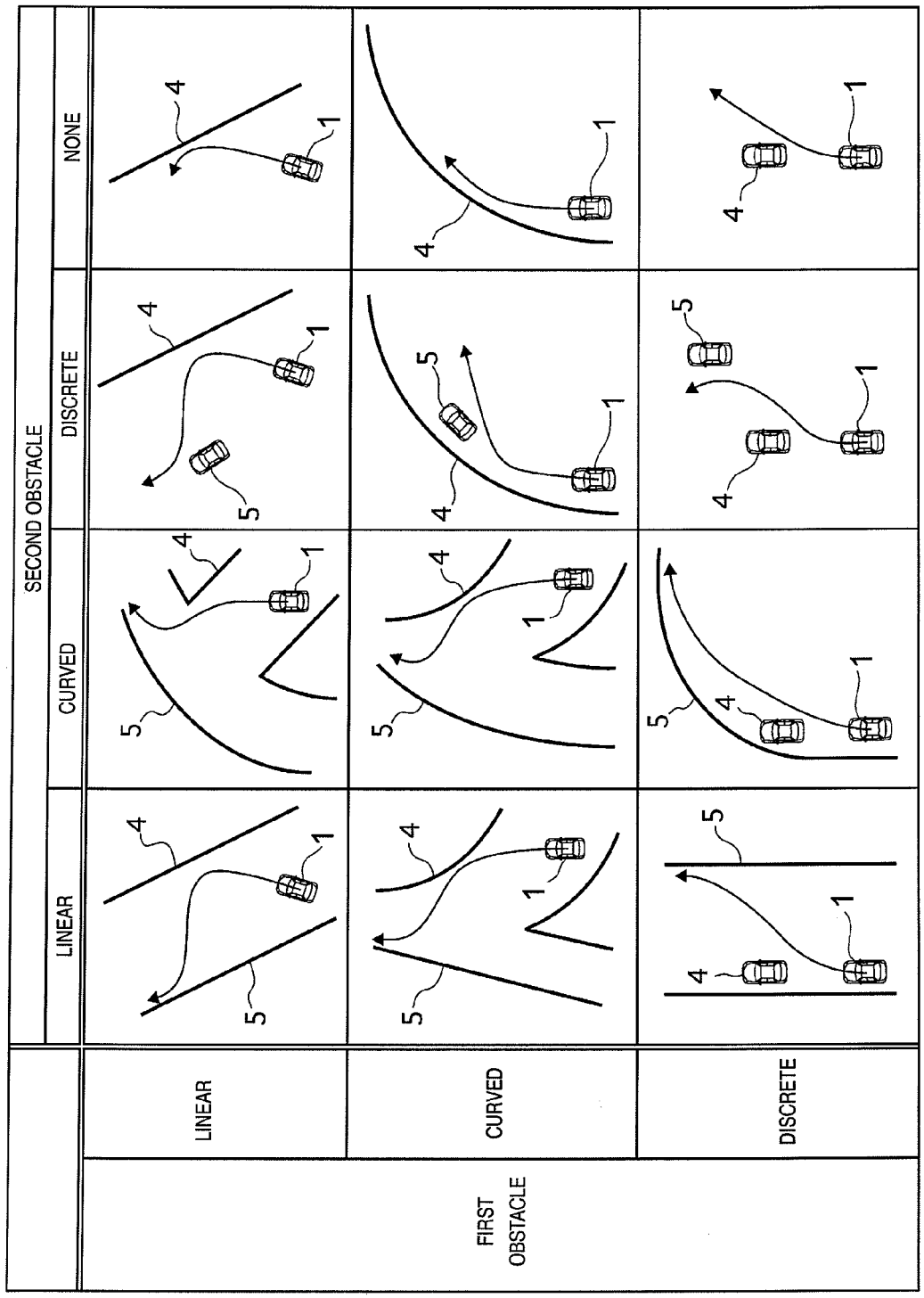
FIG. 8 is a table of simplified top plan views of situations for illustrating examples of different combinations of first and second obstacles in accordance with the first embodiment.

FIG. 8 is a table showing examples of combinations of different types of the first and second obstacles 4 and 5. As shown in FIG. 8, three types of the first obstacles 4 and four types of the second obstacles 5 are considered, and a total of twelve combinations of shapes of the first and second obstacles 4 and 5 are considered. The examples of obstacles and examples of avoidance in each combination are shown in FIG. 8.

The example shown in FIG. 7 is a case in FIG. 8 in which the first obstacle 4 is a discrete obstacle and the second obstacle 5 is a linear obstacle. The case in FIG. 7 is described as an example below.

In step S203, the turning direction for the host vehicle 1 to avoid the second obstacle 5 is predicted. For example, in a case such as the one shown in FIG. 7, the orientation of the host vehicle 1 when the host vehicle 1 passes the first obstacle 4 is to the right in relation to the direction perpendicular to the linear second obstacle 5. Therefore, it is determined that the turning direction will be to the right for the host vehicle 1 to avoid the second obstacle 5.

Figure 9:
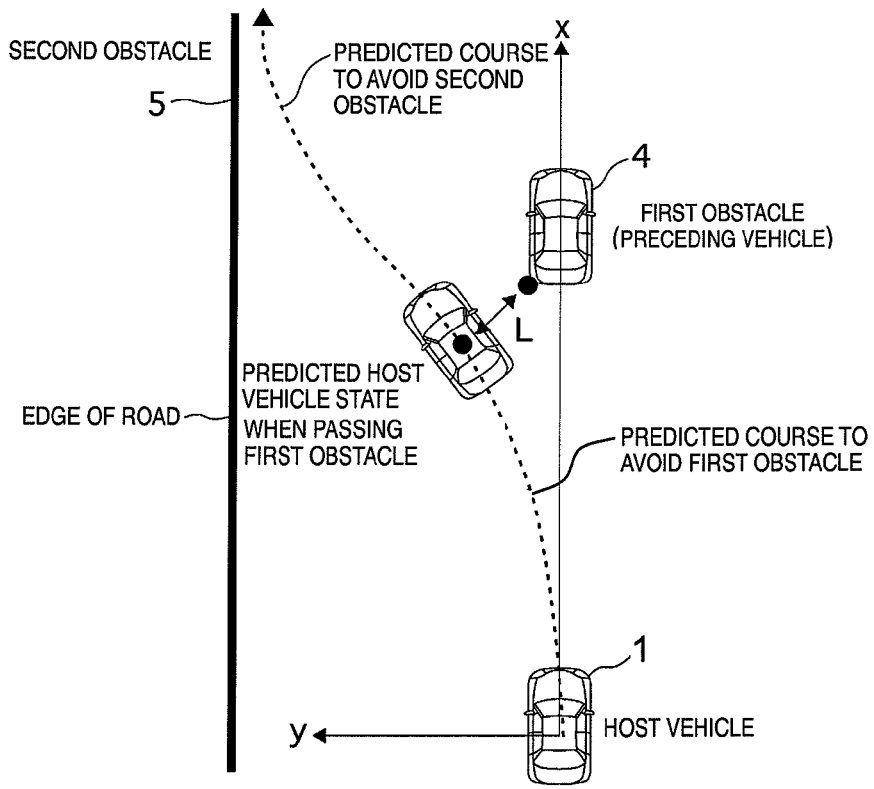
FIG. 9 is a simplified top plan view of a situation for illustrating a predicted course to be taken by the host vehicle to avoid the second obstacle in accordance with the first embodiment.

In step S204, a predicted course is predicted whereby the host vehicle 1 will avoid the second obstacle 5. FIG. 9 is a diagram for describing the predict course to be taken by the host vehicle 1 to avoid the second obstacle 5. For example, as shown in FIG. 9, first, the host vehicle state at the time the host vehicle 1 passes the first obstacle 4 is predicted, and the transverse acceleration by which the host vehicle 1 can avoid the second obstacle 5 is calculated using the vehicle model shown below. When linear approximation in the vicinity of the equilibrium point is used, the following equation expresses the relationship between the vehicle speed V, the vehicle body slip angle β, the yaw rate γ, and the vehicle body transverse acceleration rate ay.

$$V\frac{d\beta}{dt} + \gamma = ay \quad (12)$$

Consequently, the following relationship is derived from equation (12), assuming that the vehicle body slip angle β does not vary.

$$\gamma = \frac{ay}{V} \quad (13)$$

The vehicle body transverse acceleration rate ay by which the host vehicle 1 can avoid the second obstacle 5 is calculated using the relationship shown in equations (6) through (9) and equation (13) as a vehicle model.

In step S205, the target vehicle body slip angle at the time of closest proximity is set.

Figure 10:
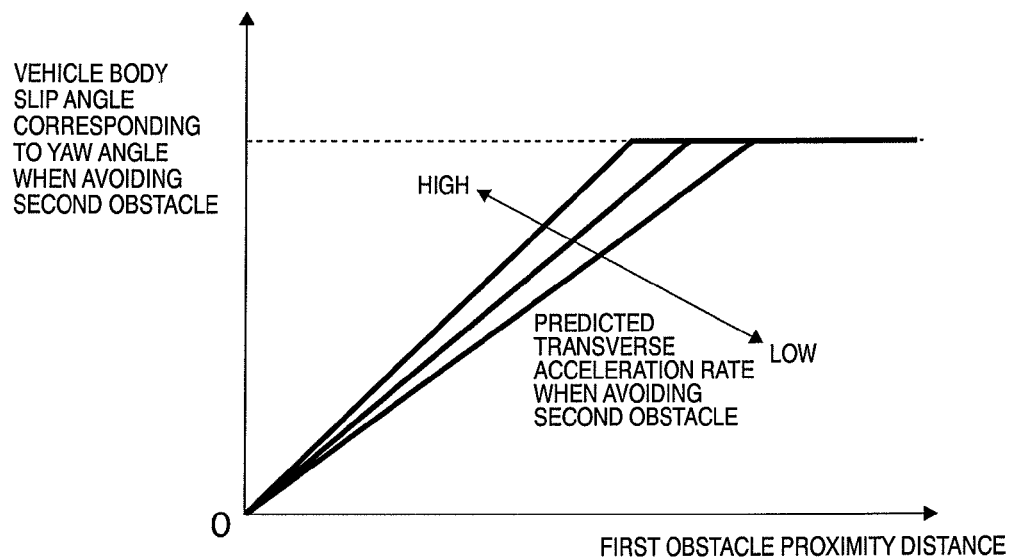
FIG. 10 is a map that is used by the obstacle avoidance control apparatus for setting the target vehicle body slip angle at the time of closest proximity in accordance with the first embodiment.

FIG. 10 is a map for setting the target vehicle body slip angle at the time of closest proximity. The absolute value of the target vehicle body slip angle at the time of closest proximity is set to increase as the first obstacle proximity distance L calculated in step S200 increases, and the absolute value of the target vehicle body slip angle at the time of closest proximity approaches zero as the first obstacle proximity distance L decreases, as shown in FIG. 10. The transverse acceleration rate for avoiding the second obstacle is predicted based on the course by which the host vehicle 1 avoids the second obstacle 5, as predicted in step S204. The absolute value of the target vehicle body slip angle at the time of closest proximity is set to increase as this predicted transverse acceleration rate increases. The target vehicle body slip angle at the time of closest proximity is set to be equal to or less than the vehicle body slip angle at which the yaw angle for avoiding the second obstacle is achieved, and that is predicted based on the course by which the host vehicle 1 avoids the second obstacle 5, as predicted in step S204.

The target vehicle body slip angle at the time of closest proximity is set as an absolute value. This is because the vehicle body slip angle is either positive or negative, depending on the turning direction of the host vehicle 1 that is trying to avoid the second obstacle 5, as predicted in step S203. When the set values are outputted, the outputted high vehicle body slip angle is set high in the direction in which the host vehicle 1 faces inward of the predicted turning direction of the host vehicle 1 that is trying to avoid the second obstacle 5.

The target vehicle body slip angle at the time of closest proximity is set according to the predicted value of the vehicle transverse acceleration rate when the host vehicle 1 is trying to avoid the second obstacle 5, but another option is to predict the turning radius of the host vehicle 1 that is trying to avoid the second obstacle 5 instead of the vehicle transverse acceleration rate of the vehicle, and to set the target vehicle body slip angle at the time of closest proximity to increase as the turning radius decreases.

Another option is to provide the target vehicle body slip angle setting section with a road surface coefficient of friction estimating section for estimating the coefficient of friction of the road surface that estimates the coefficient of friction of the road surface, and to set the target vehicle body slip angle at the time of closest proximity to increase as the coefficient of friction of the road surface decreases. The method disclosed in, e.g., Japanese Patent Laid-Open Application No. 6-258196 can be used as the method for determining the coefficient of friction of the road surface. In Japanese Patent Laid-Open Application No. 6-258196, an acceleration sensor detects the vibration acceleration G in the left and right front wheels, and the power spectrum density PSD of the acceleration G is calculated on the basis of the resulting vibration acceleration. The coefficient of friction of the road surface is detected based on the existence of frequencies within a range in which the following relationship holds true for the power spectrum density PSD: the coefficient of friction of the road surface varies in a single direction, and the power spectrum density PSD also varies in a single direction.

In step S206, since there is no second obstacle 5 and no need to take the second obstacle 5 into consideration, the target vehicle body slip angle at the time of closest proximity is set to zero so that the capacity to avoid the first obstacle 4 is as high as possible and sufficient comfort is ensured during turning.

Now, obstacle avoidance operation will be discussed. In the conventional technology, the vehicle body slip angle would be set to zero when an obstacle was to be avoided. It is known that comfort during turning is enhanced as the vehicle body slip angle approaches zero. In a course traveled by the host vehicle 1, a line that connects the position where the host vehicle 1 is in closest proximity to the obstacle and the position of the obstacle (the point of the outer shape of the obstacle that is nearest to the traveled course of the vehicle) is perpendicular to a tangent of the traveled course of the vehicle, i.e., to the traveled course of the host vehicle 1. This does not include cases in which the traveled direction of the vehicle coincides with the line that connects the turning center position of the vehicle with the position of the center of the obstacle.

Consequently, since the overall shape of the vehicle is usually a substantially rectangular shape in which the transverse width of the vehicle is less than the longitudinal length, when the host vehicle 1 is in closest proximity to an obstacle, the distance L between the host vehicle 1 and the obstacle will be greatest when the vehicle body slip angle is zero. Therefore, it is effective to bring the vehicle body slip angle to zero in order to increase the distance L between the obstacle and the vehicle body 3 when the host vehicle 1 is in proximity to an obstacle.

However, if the vehicle body slip angle is always zero when avoiding an obstacle, as is the case in the conventional technology, the turning radius of the vehicle sometimes increases, and the capacity for avoiding the obstacle is therefore sometimes reduced.

Figure 11:
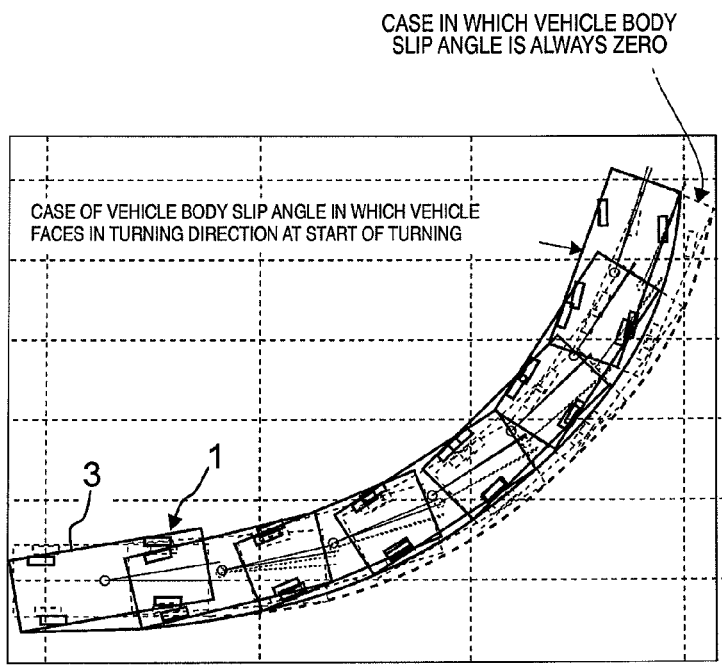
FIG. 11 is a diagrammatic view of the result of a simulation of a case in which the vehicle body slip angle is set so that the vehicle body faces in the turning direction at the start of turning, and a comparative example in which the vehicle body slip angle is set to zero.

FIG. 11 is the result of a simulation of a case in which the vehicle body slip angle is set so that the vehicle body 3 faces in the turning direction at the start of turning, and a comparative example in which the vehicle body slip angle is set to zero. In these simulation conditions, the host vehicle 1 is turned with a maximum transverse force at which the turning radius is the smallest. In FIG. 11, the trajectory of the host vehicle 1 shown by solid lines indicates a case in which the vehicle body slip angle is set in the turning direction, and the trajectory of the host vehicle 1 shown by dotted lines indicates a case in which the vehicle body slip angle is always set to zero. The circles in the vehicle center indicate the center of gravity, and the lines extending from the center of gravity indicate the orientation and direction of movement of the vehicle body 3.

As shown in FIG. 11, the trajectory of the vehicle in cases in which the vehicle body slip angle is set in the turning direction has a smaller turning radius at the center of gravity, in comparison with the trajectory of the host vehicle 1 in cases in which the vehicle body slip angle is always set to zero. The trajectory of the vehicle in cases in which the vehicle body slip angle is set in the turning direction also results in the trajectory of the outer edge of the vehicle body 3 being farther inward during turning, in comparison with the trajectory of the host vehicle 1 in cases in which the vehicle body slip angle is always set to zero. In other words, setting the vehicle body slip angle in the turning direction at the start of turning will result in improved avoidance capacity.

In view of this, in the obstacle avoidance control apparatus in first embodiment, the target vehicle body slip angle in the direction in which the host vehicle 1 faces inward of the turning direction when avoiding the second obstacle 5 at the time of closest proximity is set to increase with increased first obstacle proximity distance L when the host vehicle 1 is in closest proximity to the first obstacle 4.

In cases in which the vehicle is in closest proximity to the first obstacle 4 and there is sufficient distance to the first obstacle 4, facing the host vehicle 1 in advance in the turning direction for avoiding the second obstacle 5 makes it possible to reduce the tire force for changing the orientation of the vehicle body 3 in order to avoid the second obstacle 5, and makes it possible to use the tire force for transverse movement in a proportional manner.

Figure 12:
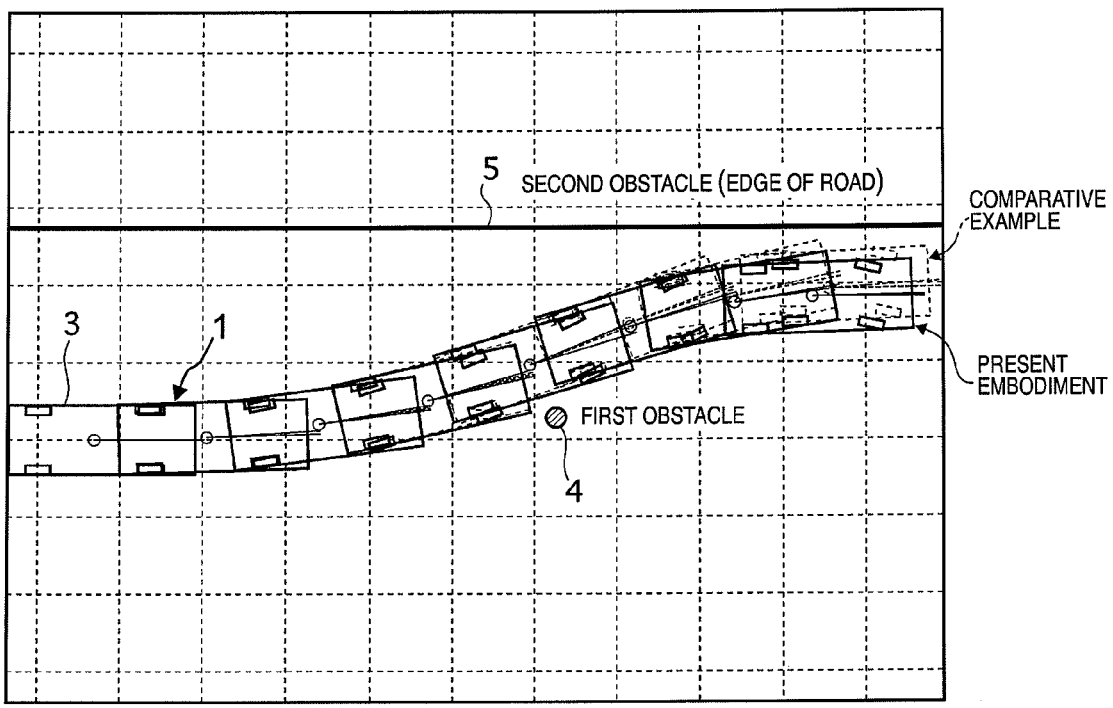
FIG. 12 is a diagrammatic view of the result of a simulation of a comparison of a case in which the host vehicle is oriented in advance in the turning direction when avoiding the second obstacle, and a case in which the vehicle body slip angle is always set to zero.

FIG. 12 is the result of a simulation of a comparison of a case in which the host vehicle 1 is oriented in advance in the turning direction when avoiding the second obstacle 5, and a case in which the vehicle body slip angle is always set to zero. FIG. 12 is an example of avoiding a first obstacle 4, which is a discrete obstacle, and a second obstacle 5, which is a linear obstacle. In this simulation, the host vehicle 1 turns with a sufficient margin relative to the limit of the tire force until reaching the first obstacle 4, the first obstacle 4 is then passed, the steering angle is greatly reduced to avoid the second obstacle 5, and the obstacle is avoided at the limit of the tire force. The host vehicle 1 shown by the solid lines represents the result of a turning trajectory in a case in which the target vehicle body slip angle at the time of closest proximity in first embodiment of the first embodiment is set in the turning direction when the second obstacle 5 is avoided, and the host vehicle 1 shown by the dotted lines represents the result of a turning trajectory in a case in which the vehicle body slip angle is always kept at zero in a comparative example.

Until the time the host vehicle 1 passes the first obstacle 4, the centers of gravity of the host vehicle 1 shown by the solid lines and the host vehicle 1 shown by the dotted lines both have the same trajectory in accordance with the steering angle of the driver. After the host vehicle 1 passes the first obstacle 4, the vehicle shown by the solid lines moves farther in the transverse direction than the host vehicle 1 shown by the dotted lines, and the host vehicle 1 shown by the solid lines is shown as being capable of avoiding the second obstacle 5 at a greater distance. In other words, a vehicle to which the obstacle avoidance control apparatus of the first embodiment is applied has a smaller turning radius when avoiding the second obstacle 5, and can also have an improved capacity to avoid the second obstacle 5.

The characteristics of the obstacle avoidance control apparatus of the first embodiment are listed below.

The target vehicle body slip angle at the time of closest proximity approaches zero as the first obstacle proximity distance L decreases when the host vehicle 1 is in closest proximity to the first obstacle 4.

In cases in which the vehicle is in closest proximity to the first obstacle 4 and there is no margin for the distance from the first obstacle 4, causing the vehicle body slip angle of the host vehicle 1 to approach zero makes it possible to maximize the distance between the vehicle body 3 and the first obstacle 4. Therefore, the capacity to avoid the first obstacle 4 can be improved.

Causing the vehicle body slip angle of the host vehicle 1 to approach zero can also reduce the unpleasant sensation during turning.

After the first obstacle 4 is avoided, the turning radius is predicted based on the course along which the host vehicle 1 is predicted to travel until coming into proximity to the second obstacle 5, and the target vehicle body slip angle in the direction in which the host vehicle 1 faces inward of the turning direction when avoiding the second obstacle 5 at the time of closest proximity is set to increase with increased turning radius.

Consequently, since it is predicted that a tire force having a small turning radius will be needed, facing the host vehicle 1 in advance in the turning direction for avoiding the second obstacle 5 makes it possible to reduce the tire force for changing the orientation of the vehicle body in order to avoid the second obstacle 5, and makes it possible to use the tire force for transverse movement in a proportional manner. Therefore, the host vehicle 1 can move along the predicted turning radius, and the capacity to avoid the second obstacle 5 can be improved.

The unpleasant sensation during turning can be reduced because the target vehicle body slip angle at the time of closest proximity when avoiding the second obstacle 5 can be set to decrease as the turning radius increases.

After the first obstacle 4 is avoided, the transverse acceleration rate of the vehicle is predicted based on the course along which the host vehicle 1 is predicted to travel until coming into proximity to the second obstacle 5, and the target vehicle body slip angle in the direction in which the host vehicle 1 faces inward of the turning direction when avoiding the second obstacle 5 at the time of closest proximity is set to increase with increased transverse acceleration rate of the vehicle.

Consequently, since it is predicted that a tire force having a high vehicle transverse acceleration rate will be needed, facing the host vehicle 1 in advance in the turning direction for avoiding the second obstacle 5 makes it possible to reduce the tire force for changing the orientation of the vehicle body in order to avoid the second obstacle 5, and makes it possible to use the tire force for transverse movement in a proportional manner. Therefore, the vehicle can move at the predicted vehicle transverse acceleration rate, and the capacity to avoid the second obstacle 5 can be improved.

The unpleasant sensation during turning can be reduced because the target vehicle body slip angle at the time of closest proximity when avoiding the second obstacle 5 can be set to decrease as the transverse acceleration rate of the vehicle decreases.

The yaw angle of the host vehicle 1 when in proximity to the second obstacle is estimated, and the target vehicle body slip angle is set so that the yaw angle is equal to or less than the predicted yaw angle.

In a case in which the host vehicle 1 passes the first obstacle 4, the vehicle sometimes turns in the opposite direction of the turning direction for avoiding the second obstacle 5 when the vehicle body slip angle at the time of closest proximity is set so that the yaw angle is equal to or greater than the yaw angle maintained when the second obstacle 5 is passed. There is a possibility that the tire force can be used for yaw movement in order to bring about an intentional turn in the opposite direction and to reduce the tire force used for transverse movement, making it possible to markedly increase, rather than reduce, the turning radius.

In first embodiment, the target vehicle body slip angle at the time of closest proximity is set so as to be equal to or less than the yaw angle maintained when the host vehicle 1 is trying to avoid the second obstacle 5. Therefore, it is possible to prevent the host vehicle 1 from turning in the direction opposite the turning direction when the host vehicle 1 is turned to avoid the second obstacle 5. Therefore, sufficient tire force can be used for transverse movement, and the turning radius can be reduced.

In cases in which a second obstacle 5 is not detected, the target vehicle body slip angle at the time of closest proximity is set to zero. Therefore, setting the vehicle body slip angle of the host vehicle 1 to zero makes it possible to maximize the distance between the vehicle body 3 and the first obstacle 4. Accordingly, the capacity to avoid the first obstacle 4 can be improved.

The unpleasant sensation during turning can be reduced by setting the vehicle body slip angle of the host vehicle 1 to zero.

Also, the coefficient of friction of the road surface is estimated, and the target vehicle body slip angle at the time of closest proximity is set to increase as the estimated coefficient of friction of the road surface decreases. When the coefficient of friction of the road surface decreases, the vehicle transverse acceleration rate that can be achieved is reduced, and the host vehicle 1 therefore has a lower capacity to avoid the second obstacle 5.

Facing the host vehicle 1 in advance in the turning direction for avoiding the second obstacle 5 makes it possible to reduce the tire force for changing the orientation of the vehicle body in order to avoid the second obstacle 5, and makes it possible to use the tire force for transverse movement in a proportionate manner. Consequently, it is possible to reduce degradation in the ability of the host vehicle 1 to avoid the second obstacle 5.

Next, the effects of the first embodiment will be described.

In the first embodiment, the camera 50 and the image-processing device 51 are used for detecting the first and second obstacles 4 and 5 in front of the host vehicle, with the second obstacle avoidance direction determining section for determining a second obstacle avoidance direction to avoid the second obstacle (step S203) that predicts or determines the second obstacle avoidance turning direction, which is a turning direction to avoid the second obstacle 5. Also the first obstacle proximity distance prediction section (step S200) is configured to predict a first obstacle proximity distance between the host vehicle 1 and the first obstacle 4 at a time of closest proximity between the host vehicle 1 and the first obstacle 4. The target vehicle body slip angle setting section (step S205, step S206) is configured to set a target vehicle body slip angle at the time of closest proximity, which is a target vehicle body slip angle in the position of the vehicle body center at the time of closest proximity, in a direction in which the host vehicle faces further inward of the second obstacle avoidance turning direction as the proximity distance to the first obstacle increases. The vehicle behavior controlling section (step S106) is configured to control a vehicle behavior of the vehicle so that the vehicle body slip angle at the center position of the vehicle at the time of closest proximity coincides with the target vehicle body slip angle at the time of closest proximity.

Consequently, in cases in which the host vehicle is in closest proximity to the first obstacle 4 and there is sufficient distance from the first obstacle 4, facing the host vehicle 1 in advance in the turning direction for avoiding the second obstacle 5 makes it possible to reduce the tire force for changing the orientation of the vehicle body in order to avoid the second obstacle 5, and makes it possible to use the tire force for transverse movement in a proportional manner. Therefore, the turning radius maintained when avoiding the second obstacle 5 can be reduced, and the capacity to avoid the second obstacle 5 can be improved.

The target vehicle body slip angle setting section for setting the target vehicle body slip angle at the time of closest proximity (step S205) sets the target vehicle body slip angle at the time of closest proximity so as to approach zero as the first obstacle proximity distance L decreases. Consequently, in cases in which the vehicle is in closest proximity to the first obstacle 4 and there is sufficient distance from the first obstacle 4, causing the vehicle body slip angle of the host vehicle 1 to approach zero makes it possible to maximize the distance between the vehicle body and the first obstacle 4. Therefore, the capacity to avoid the first obstacle 4 can be improved.

The target vehicle body slip angle setting section for setting the target vehicle body slip angle at the time of closest proximity (step S204, step S205) predicts the turning radius of the predicted course taken by vehicle until coming into proximity of the second obstacle 5 after passing the first obstacle 4, and sets the target vehicle body slip angle at the time of closest proximity to increase in the direction in which the vehicle faces further inward of the second obstacle avoidance direction as the predicted turning radius decreases. Consequently, since it is predicted that a tire force having a small turning radius will be needed, facing the host vehicle 1 in advance in the turning direction for avoiding the second obstacle 5 makes it possible to reduce the tire force for changing the orientation of the vehicle body in order to avoid the second obstacle 5, and makes it possible to use the tire force for transverse movement in a proportional manner. Therefore, the vehicle can move along the predicted turning radius, and the capacity to avoid the second obstacle 5 can be improved. The unpleasant sensation during turning can be reduced because the target vehicle body slip angle at the time of closest proximity when avoiding the second obstacle 5 can be set to decrease as the turning radius increases.

The target vehicle body slip angle setting section for setting the target vehicle body slip angle at the time of closest proximity (step S204, S205) predicts the transverse acceleration rate when the vehicle travels along the predicted course after avoiding the first obstacle 4 until coming into proximity to the second obstacle 5, and sets the target vehicle body slip angle at the time of closest proximity to increase in the direction in which the vehicle faces further inward of the second obstacle avoidance direction as the predicted vehicle transverse acceleration rate increases. Consequently, since it is predicted that a tire force having a high vehicle transverse acceleration rate will be needed, facing the host vehicle 1 in advance in the turning direction for avoiding the second obstacle 5 makes it possible to reduce the tire force for changing the orientation of the vehicle body 3 in order to avoid the second obstacle 5, and makes it possible to use the tire force for transverse movement in a proportional manner. Therefore, the host vehicle 1 can move at the predicted vehicle transverse acceleration rate, and the capacity to avoid the second obstacle 5 can be improved. The unpleasant sensation during turning can be reduced because the target vehicle body slip angle at the time of closest proximity when avoiding the second obstacle 5 can be set to decrease as the transverse acceleration rate of the vehicle decreases.

The target vehicle body slip angle setting section for setting the target vehicle body slip angle at the time of closest proximity (step S205) predicts the yaw angle of the vehicle when the vehicle is in a prescribed proximity to the second obstacle 5, and sets the target vehicle body slip angle at the time of closest proximity to be equal to or less than the vehicle body slip angle at which the predicted yaw angle is achieved. Consequently, it is possible to prevent the host vehicle 1 from turning in the direction opposite the turning direction when the host vehicle 1 is turned to avoid the second obstacle 5. Therefore, sufficient tire force can be used for transverse movement, and the turning radius can be reduced.

The target vehicle body slip angle setting section for setting the target vehicle body slip angle at the time of closest proximity (step S205) sets the target vehicle body slip angle at the time of closest proximity to zero in cases in which a second obstacle 5 is not detected. Consequently, setting the vehicle body slip angle of the host vehicle 1 to zero makes it possible to maximize the distance between the vehicle body 3 and the first obstacle 4. Therefore, the capacity to avoid the first obstacle 4 can be improved. Also, setting the vehicle body slip angle of the host vehicle 1 to zero makes it possible to reduce the unpleasant sensation during turning.

The target vehicle body slip angle setting section for setting the target vehicle body slip angle at the time of closest proximity (step S205) estimates the coefficient of friction of the road surface, and sets the target vehicle body slip angle at the time of closest proximity to increase as the estimated value of the coefficient of friction of the road surface decreases. Consequently, facing the host vehicle 1 in advance in the turning direction for avoiding the second obstacle 5 makes it possible to reduce the tire force for changing the orientation of the vehicle body 3 in order to avoid the second obstacle 5, and makes it possible to use the tire force for transverse movement in a proportional manner. Therefore, it is possible to reduce degradation in the ability of the host vehicle 1 to avoid the second obstacle 5.

Preferred embodiment for implementing the present invention was described based on the first embodiment, but the specific configuration of the present invention is not limited to the first embodiment, and the present invention also includes design modifications and the like made within a range that does not deviate from the scope of the invention.

In first embodiment, the vehicle body slip angle $\beta$ was detected, but another option, as disclosed in Japanese Patent Laid-open Application No. 5-310142, is to use an observer or the like based on a mathematic model of the vehicle movement characteristics to estimate the vehicle body slip angle on the basis of a steering input, drive force difference input, and detected yaw rate value.

Also, the vehicle movement model expressed in equations (6) through (11) is not limited to a linear approximation model, and a non-linear model that takes into account the friction circle characteristics of the tires, suspension dynamics, and other factors may be used. The prediction of the course of the vehicle is also not limited to using a vehicle model, and another method may be used, such as using a preset map to calculate the course on the basis of the operating state of the driver and the current vehicle state.

The turning direction assumed by the host vehicle 1 that is trying to avoid the second obstacle 5 can be determined in step S203 while taking into account the original direction in which the vehicle was moving, the positional relationship to the second obstacle 5, and other factors.

The course taken by the host vehicle 1 to avoid the second obstacle 5 can be predicted in step S204 by using a non-linear vehicle model, a pre-calculated map, or the like, as long as the course can be predicted based on the positional relationship between the first obstacle 4 and the second obstacle 5.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including""having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention. The terms of degree such as "substantially""about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An obstacle avoidance control apparatus comprising:
    an obstacle detecting section arranged to detect first and second obstacles in front of a host vehicle, with the second obstacle being detected as being farther in front of the host vehicle than the first obstacle;
    a first obstacle proximity distance prediction section configured to predict a first obstacle proximity distance between the host vehicle and the first obstacle at a time of closest proximity between the host vehicle and the first obstacle;
    a second obstacle avoidance direction determining section configured to determine a second obstacle avoidance direction that is predicted to avoid the second obstacle;
    a target vehicle body slip angle setting section configured to set a target vehicle body slip angle in a direction at the time of closest proximity with respect to a vehicle body center of the host vehicle, such that the host vehicle faces further inward of the second obstacle avoidance turning direction as the first obstacle proximity distance increases; and
    a vehicle behavior controlling section configured to control a vehicle behavior of the host vehicle so that an actual vehicle body slip angle with respect to the vehicle body center at the time of closest proximity coincides with the target vehicle body slip angle at the time of closest proximity.

2. The obstacle avoidance control apparatus according to claim 1, wherein
    the target vehicle body slip angle setting section is further configured to set the target vehicle body slip angle at the time of closest proximity so as to approach zero as the first obstacle proximity distance decreases.

3. The obstacle avoidance control apparatus according to claim 1, wherein
    the target vehicle body slip angle setting section is further configured to predict a turning radius of a predicted course to be taken by the host vehicle until the host vehicle approaches the second obstacle upon avoiding the first obstacle, and
    the target vehicle body slip angle setting section is further configured to set the target vehicle body slip angle in the direction at the time of closest proximity to increase such that the host vehicle faces further inward of the second obstacle turning direction as the turning radius of the predicted course decreases.

4. The obstacle avoidance control apparatus according to claim 1, wherein
    the target vehicle body slip angle setting section is further configured to predict a vehicle transverse acceleration rate of the host vehicle along a predicted course to be taken by the host vehicle until the host vehicle approaches the second obstacle upon avoiding the first obstacle, and
    the target vehicle body slip angle setting section is further configured to set the target vehicle body slip angle in the direction at the time of closet proximity to increase such that the host vehicle faces further inward of the second obstacle turning direction as the vehicle transverse acceleration rate of the host vehicle increases.

5. The obstacle avoidance control apparatus according to claim 1, wherein
    the target vehicle body slip angle setting section is further configured to predict the yaw angle of the host vehicle when the host vehicle is in a prescribed proximity to the second obstacle, and
    the target vehicle body slip angle setting section is further configured to set the target vehicle body slip angle at the prescribed proximity to the second obstacle to be equal to or less than a vehicle body slip angle at which the predicted yaw angle is achieved.

6. The obstacle avoidance control apparatus according to claim 1, wherein
    the target vehicle body slip angle setting section is further configured to set the target vehicle body slip angle at the time of closest proximity to zero when the second obstacle is not detected.

7. The obstacle avoidance control apparatus according to claim 1, wherein the target vehicle body slip angle setting section is further configured to estimate a coefficient of friction of a road surface, and the target vehicle body slip angle setting section is further configured to increase the target vehicle body slip angle at the time of closest proximity as the coefficient of friction of the road surface value decreases.

8. An obstacle avoidance control apparatus comprising:

means for detecting first and second obstacles in front of a host vehicle, and for detecting the second obstacle being farther in front of the host vehicle than the first obstacle;

means for predicting a first obstacle proximity distance between the host vehicle and the first obstacle at a time of closest proximity between the host vehicle and the first obstacle;

means for determining a second obstacle avoidance direction that is predicted to avoid the second obstacle;

means for setting a target vehicle body slip angle in a direction at the time of closest proximity with respect to a vehicle body center of the host vehicle, such that the host vehicle faces further inward of the second obstacle avoidance turning direction as the first obstacle proximity distance increases; and means for controlling a vehicle behavior of the host vehicle so that an actual vehicle body slip angle with respect to the vehicle body center at the time of closest proximity coincides with the target vehicle body slip angle at the time of closest proximity.

9. An obstacle avoidance control method comprising:

detecting first and second obstacles in front of a host vehicle, with the second obstacle being detected as being farther in front of the host vehicle than the first obstacle;

predicting a first obstacle proximity distance between the host vehicle and the first obstacle at a time of closest proximity between the host vehicle and the first obstacle;

determining a second obstacle avoidance direction that is predicted to avoid the second obstacle;

setting a target vehicle body slip angle in a direction at the time of closest proximity with respect to a vehicle body center of the host vehicle, such that the host vehicle faces further inward of the second obstacle avoidance turning direction as the first obstacle proximity distance increases; and controlling a vehicle behavior of the host vehicle so that an actual vehicle body slip angle with respect to the vehicle body center at the time of closest proximity coincides with the target vehicle body slip angle at the time of closest proximity.

* * * * *